United States Patent
Shimizu (10) Patent No.: US 6,814,219 B2
(45) Date of Patent: Nov. 9, 2004

(54) OVERHEAD CONVEYOR

(75) Inventor: Toshiharu Shimizu, Mie (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 160 days.

(21) Appl. No.: 10/129,009

(22) PCT Filed: Sep. 12, 2001

(86) PCT No.: PCT/JP01/07899

§ 371 (c)(1),
(2), (4) Date: May 1, 2002

(87) PCT Pub. No.: WO02/24507

PCT Pub. Date: Mar. 28, 2002

(65) Prior Publication Data

US 2002/0175048 A1 Nov. 28, 2002

(30) Foreign Application Priority Data

Sep. 22, 2000 (JP) .......................................... 2000-288390

(51) Int. Cl.[7] ......................... B65G 29/00; B65G 37/00; B65G 43/08; B65G 47/34; B65G 47/84
(52) U.S. Cl. ............................. 198/465.4; 198/345.1; 198/680; 198/476.1; 198/678.1; 104/89; 104/172.4
(58) Field of Search ................ 198/465.4, 687.1, 198/803.11, 678.1, 345.1, 680, 476.1; 104/172.4, 251, 89

(56) References Cited

U.S. PATENT DOCUMENTS

| 4,924,996 | A | * | 5/1990 | Svensson et al. | ...... 198/341.05 |
| 5,340,249 | A | * | 8/1994 | Nakamura | .................. 105/148 |
| 5,505,290 | A | * | 4/1996 | Fujii et al. | ............... 198/345.1 |
| 6,196,372 | B1 | * | 3/2001 | Rossi | ...................... 198/345.1 |

FOREIGN PATENT DOCUMENTS

| JP | 63-171713 | 7/1988 |
| JP | 2-45873 | 3/1990 |
| JP | 4-46008 | 4/1992 |
| JP | 6-156662 | 3/1994 |
| JP | 6-183338 | 7/1994 |

* cited by examiner

Primary Examiner—Gene O. Crawford
(74) Attorney, Agent, or Firm—Sughrue Mion, PLLC (57) ABSTRACT

An overhead conveyor in which a pair of front hanger arms (2a, 2a) for loading the bottom of a front part of a vehicle body and a pair of rear hanger arms (2b, 2b) for loading the bottom of a rear part of a vehicle body are arranged at a hanger body (2d) which moves along with a running rail established in the ceiling. The pair of front hanger arms (2a, 2a) and the pair of rear hanger arms 2b, 2b are movably attached to the hanger body 2d, the hanger body 2d having an engaging groove (13) for engaging the movably attached pair of hanger arms at each engaging position of the vehicle body through each an engaging lever (14), having an actuator (16) to control the engaging-and-disengaging movement of the engaging lever.

9 Claims, 9 Drawing Sheets

OVERHEAD CONVEYOR

FIELD OF THE INVENTION

The present invention relates to the overhead conveyor for carrying a vehicle body, and preferably, relates to the overhead conveyor, which carries a vehicle body by supporting the front side bottom part and the rear side bottom part of the vehicle body with the front side hanger arm and rear side hanger arm, respectively.

BACKGROUND ART

Generally, in order to perform efficient assembly in the limited premise, three-dimension of an assembly line is propagated. Especially, in the vehicle assembly line in which various components of a vehicle are attached to the vehicle body from the lower direction of it, a conveyor line is installed in two steps of upper and lower sides. And in this vehicle assembly line, a vehicle body is temporarily taken up above the downward conveyor line (hereafter called as friction conveyor) by the upper conveyor line (hereafter called as overhead conveyor). And in this state, the components for the underbody of a vehicle are attached from the lower direction of it.

As one of this kind of conventional overhead conveyor, the conveyor in which a vehicle body is taken up on supporting the side-sill of the vehicle body is known. And as another kind of conventional overhead conveyor, the conveyor in which damage on the various components for attaching to the side-sill part of a vehicle body is prevented is known (disclosed in Japanese Laid-Open Patent publication H2-117508). In the latter conveyor, the damage is prevented by supporting the vehicle body using the front hanger arm and the rear hanger arm, one of which is fixed to the hanger body and another of which is fixed to the hanger body movably.

Especially, with the latter overhead conveyor (disclosed in a Japanese Laid-Open Patent publication H2-117508), the holding member for front wheels is fixed to the front part of the conveyance equipment which moves along with the conveyance rail through a couple of perpendicular arms. And the holding member for the rear wheel is movably arranged on the sliding arm, which is built over the sliding arm fixed to a couple of perpendicular arms at the rear of the conveyance equipment. So, in the over head conveyor, the safe carriage of a vehicle may be attained by holding the front wheel and rear wheel, which were supported by a front holding member and a rear holding member, using a front part holding member and the rear holding member, respectively.

The components for the underbody of a vehicle will be attached from the lower direction of it, on restricting the movement of a vehicle body by holding it using the front holding member and the rear holding member. However, a relative location gap between the attaching components and the vehicle side occurs, depending on the buffer of suspension equipment, such as a tire and a shock absorber. So, the difficulty of the attaching operation will arise by this location gap.

Arranging the means for averting attaching operation difficulties, which is caused by these buffers on the equipment side such as a steering system and an engine and the like, is also assumed. However, since the construction of equipment is more complicated and production cost goes up, further arrangement of such means is difficult.

DISCLOSURE OF THE INVENTION

Thus, a problem of assembling the various components with no difficulty and without causing damage on the bottom part of the vehicle body on assembling, even when the vehicle on assembling may differ in it's form, arises. This invention aims at solving this problem.

The present invention is proposed in order to attain the above-mentioned purpose, and it offers the overhead conveyor equipped with the following composition. That is, an overhead conveyor in which a pair of front hanger arms for loading the bottom part of front part of a vehicle body and a pair of rear hanger arms for loading the bottom part of rear part of a vehicle body are arranged at a hanger body which moves along with the rail provided in the ceiling side, is characterized in that one of the pair of front hanger arms and the pair of rear hanger arms are movably attached to the hanger body, the hanger body having an engaging part to control the movably attached pair of hanger arms with each engaging position of vehicle body through an engaging lever, and having an actuator for operating the engaging-and-disengaging movement of the engaging lever is offered.

Also, the engaging lever may be provided to the movably attached pair of hanger arms, and the actuator is set to move corresponding to the movement of the movably attached pair of hanger arms matched with a vehicle type.

With the above construction, various type of vehicle bodies are carried on stabilized and supported condition, without being affected by the buffer effect of the elasticity of a tire and a suspension equipment. Moreover, the difficulty of the assembling operation will be improved as compared to the assembling operation in the conventional overhead conveyor in which the vehicle body is supported by a roller.

An engaging lever is engaged with the engaging part by performing the following operations. First, the pair of hanger arms are moved, which can move corresponding to the support position of various vehicle bodies, and moves an actuator corresponding to the moved position of the pair of hanger arms, and then the engaging lever is engaged with the engaging part by operating the actuator to the engagement side. Then the pair of hanger arms, which are movably provided on the hanger body, may be engaged with the hanger body.

BEST MODE FOR CARRYING OUT THE INVENTION

Hereafter, the preferred embodiment of the present invention will be explained referring to the attached drawings.

Figure 1:
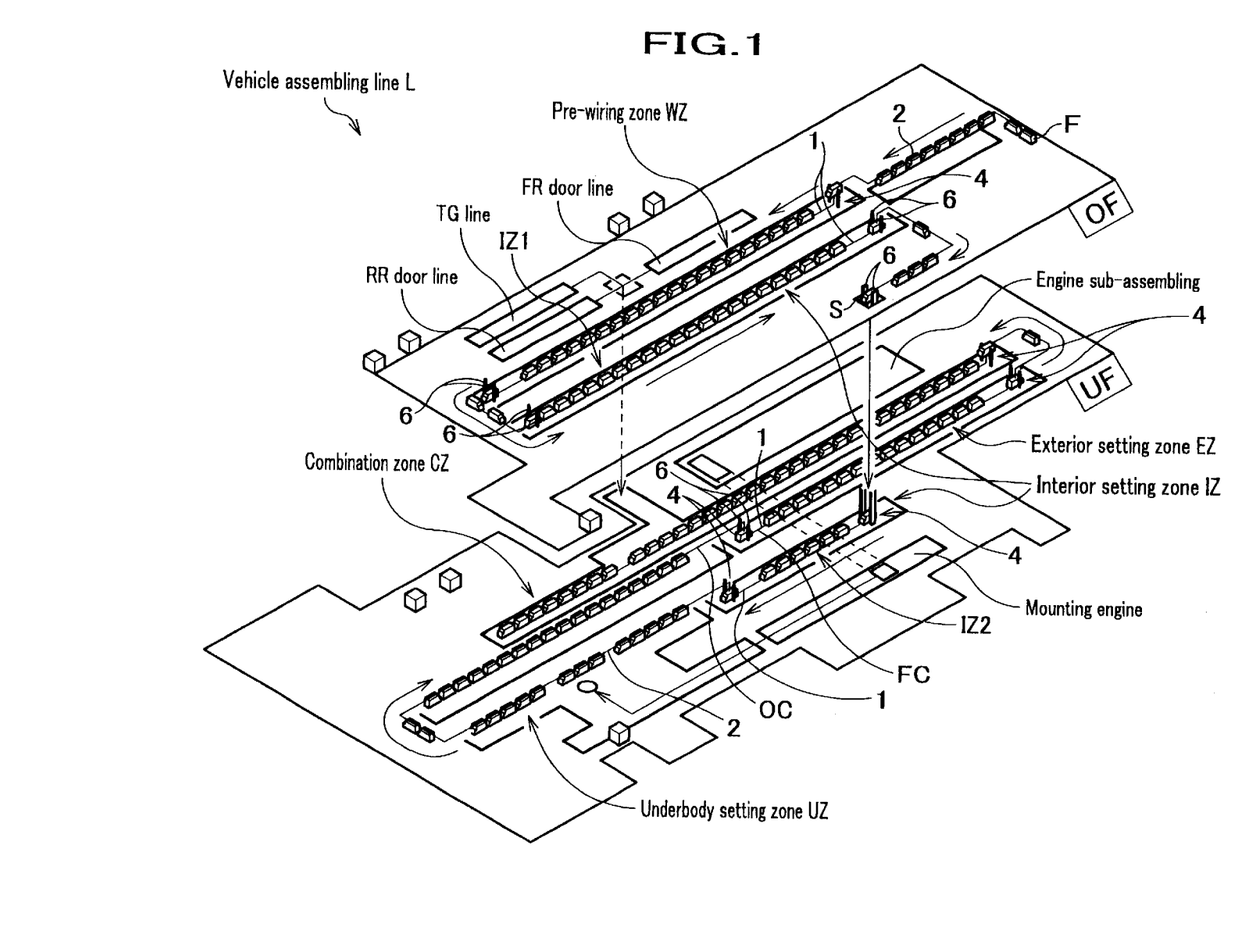
FIG. 1 is an embodiment of the present invention and a description view showing the layout of an automobile assembly line.
Figure 2:
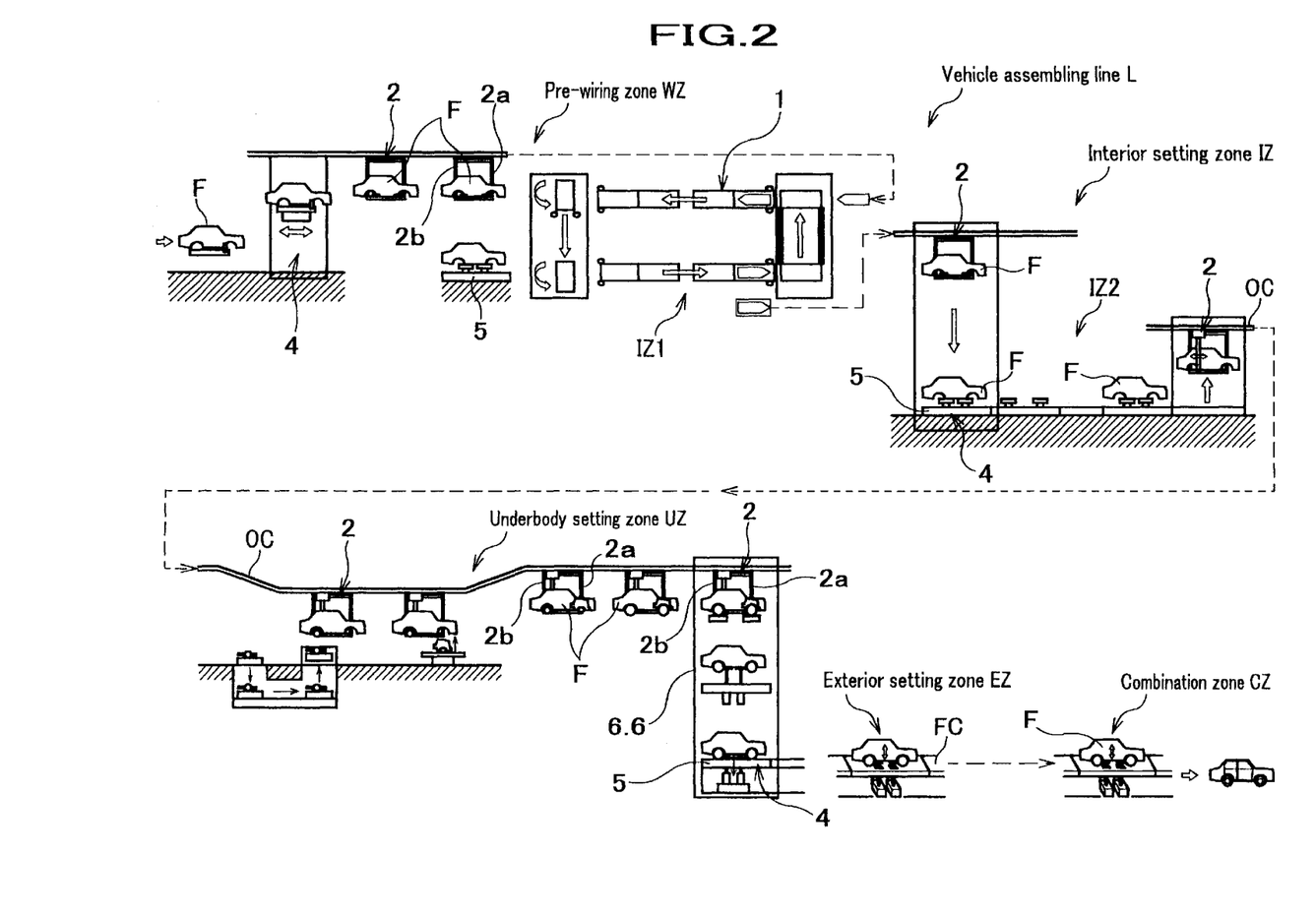
FIG. 2 is an embodiment of the present invention and a description view showing the layout of an automobile assembly line.

FIG. 1 and FIG. 2 show the layout of an automobile assembly line. As shown in these drawings, an automobile assembly line L is arranged so that a vehicle body F may be carried in order of a pre-wiring zone WZ→interior setting zone IZ→underbody setting zone UZ→exterior setting zone EZ→combination zone CZ. In order to carry a vehicle body F for assembly, a friction conveyor 1 or an overhead conveyor 2 is provided in each zone. Each shaft part S is provided for carrying the vehicle body F to the lower floor UF from the upper floor OF. At the vehicle body delivering part 4 fixed at the boundary between the friction conveyor 1 and the overhead conveyor 2, not-illustrated lifter (drops lifter) for enabling the delivery of the vehicle body F is provided.

The lifter is arranged along with the guidepost 6, 6 which is arranged at both right and left side of the carriage line of the vehicle body F in such a way to freely move it upward or downward. In order to carry out the various kinds of vehicle body on holding it, the front hanger arms 2a, 2a and the rear hanger arms 2b, 2b are arranged on the overhead conveyor 2. Therefore, the vehicle body part F can be carried to the friction conveyor 1 from the overhead conveyor 2 by performing the following processes. That is, first, performing the process in which the vehicle body F is pushed up by ascent of the lifter and is released from the front hanger arms 2a, 2a and the rear hanger arms 2b, 2b respectively. And next, performing the process which enables releasing of the vehicle body F by opening the front hanger arms 2a, 2a and the rear hanger arms 2b, 2b. And finally, performing the process in which the lifter is connected to the friction conveyor 2 by descent of the lifter in this condition. Moreover, the vehicle body F can be carried to the overhead conveyor 2 from friction conveyor 1 by performing each of these processes with a reverse order.

The preferred embodiment of the overhead conveyor 2 is shown in FIG. 3 through FIG. 7. As shown in FIG. 3 through FIG. 7, the overhead conveyor 2 consists essentially of a pair of front hanger arms 2a, 2a, a pair of rear hanger arms 2b, 2b, and a hanger body 2d. The front hanger arms 2a, 2a hold the bottom part (Jack rise part) of the front part of a vehicle body F. The pair of the rear hanger arms 2b, 2b hold the bottom part (Jack rise part) of the rear part of the vehicle body F. And the hanger body 2d moves along with the rail R of ceiling side and with which the front hanger arms 2a, 2a and rear hanger arms 2b, 2b are attached through rotation arms (connection arms) 2c, 2c.

Each of the rotation arms 2c, 2c is pivotably or rotatably supported around the horizontal axis at the front part in the running direction of the hanger body 2d and the rear part in the running direction of the hanger body 2d, respectively. The front hanger arms 2a and 2a are fixed to the front end part in the running direction of the connection beams 2e, 2e with which each tip part of the rotation arms 2c and 2c is connected at the base end of it. The upper end (guide 2b) of each rear hanger arms 2b, 2b is movably engaged with each guide rail 2f attached to the rear side in the running direction of the bottom part of connection beam 2e. And the support axis 7 which is arranged parallel to the connection beam 2e is movably coupled to the rear hanger arm 2b at the upper side of the rear hanger arm 2b. A connection frame 2g is coupled between two support frames 8. The support axis 7 is attached to the connection beams 2e to which both rotation arms 2c, 2c are connected in the running direction and to the two support frames 8 with regarding the support frames 8 as a fixed system.

Therefore, the rear hanger arm 2b can slide along with the guide rail 2f and the support axis 7, while rotation in the circumferential direction of the support axis 7 is restricted. When the rotation arm 2c rotates in the circumferential direction of it, the rear hanger arm 2b thus will be rotated around the horizontal axis. Since, the rotation of the each rotation arm 2c is operated by the opening-and-closing system (not shown), such as a set of a linkage and an actuator, which runs the linkage, each of the rotation arms 2c thus rotates in mutual opposite rotative direction, that is, in the opening-and-closing direction. The hanger body 2d is moved by the trolley T which runs by running by itself or towage.

A vehicle body support parts 9a, 9b for supporting the jack rise part (bottom part) of the vehicle body F are provided at the both tip end part of the front hanger arms 2a and rear hanger arms 2b, respectively. A buffer parts 10, such as a block made of rubber, for supporting the bottom part (jack rise part) of the vehicle body F without giving the damage on the vehicle body, is attached to the vehicle body support parts 9a and 9b. The locator pin (positioning pin) 12, for positioning a vehicle body F by engaging it into a guide hole (positioning hole) 11, which is pored onto the jack rise part of a vehicle body F, is merely fixed to the vehicle body support part 9a of the each front hanger arm 2a.

Figure 3:
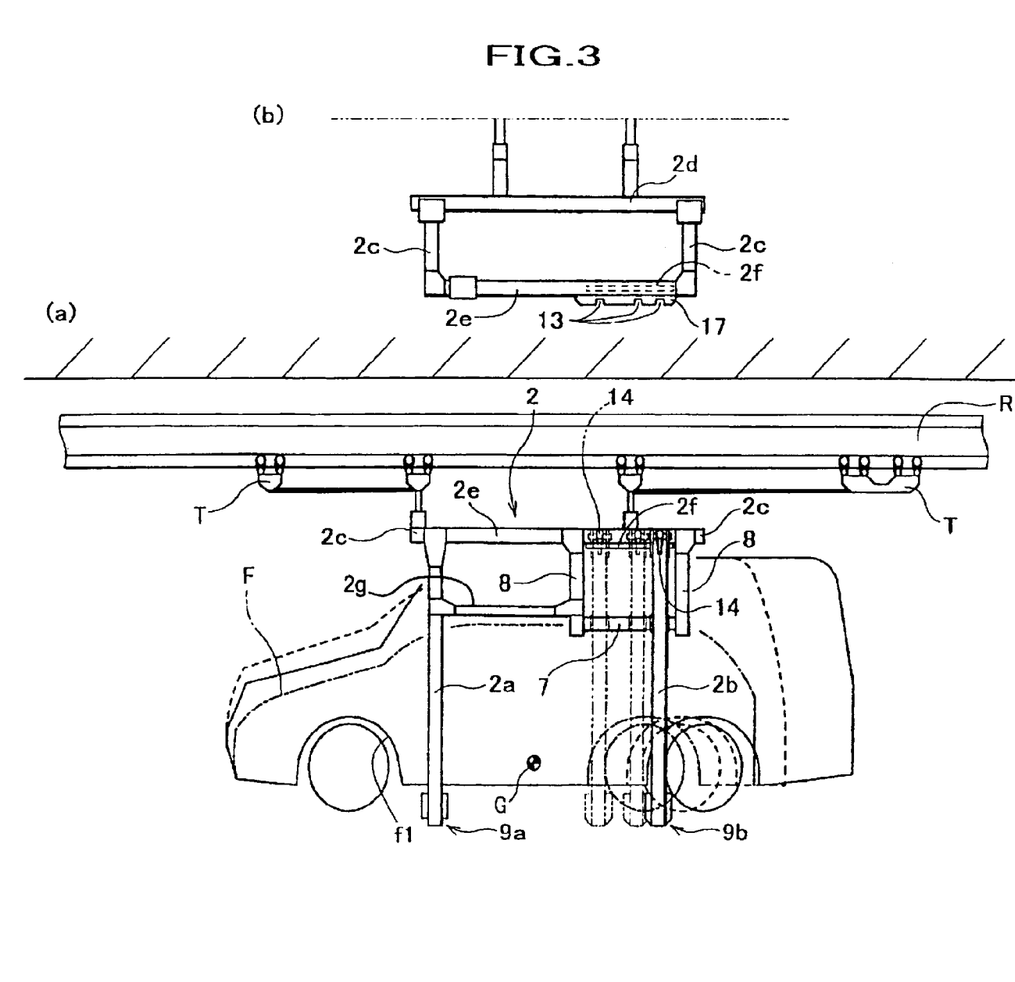
FIG. 3 is an embodiment of the present invention and a side view showing the relation between an overhead conveyor and a vehicle body.

The guide hole 11 is bored on the vehicle body F of predetermined distance back from the tire housing f1 of the vehicle body F. The center of gravity of the vehicle body G is determined so that it exists in the rear direction of the vehicle body F rather than the bored position of the guide hole 11. Consequently, when the support position of each rear hanger arm 2b to the bottom parts (jack rise part) of various type of vehicle bodies F is determined based on the guide hole 11 so that each rear hanger arm 2b is engaged to each of the engaging position, various kinds of vehicle bodies F will be supported safely. Various types of vehicle bodies differing in form and size thus will be carried in safely.

The length of the connection beams 2e, the fitting position of the support frame 8, and the intervals between the support frames 8 and 8 are determined based on the maximum wheel base of the vehicle body F to be treated. The center of gravity G of the vehicle body is established in the middle of the guide hole 11 and each support position of the rear hanger arm 2b. Each support position of the rear hanger arms 2b is determined corresponding to the various vehicle bodies from which the wheel base differs.

Figure 7:
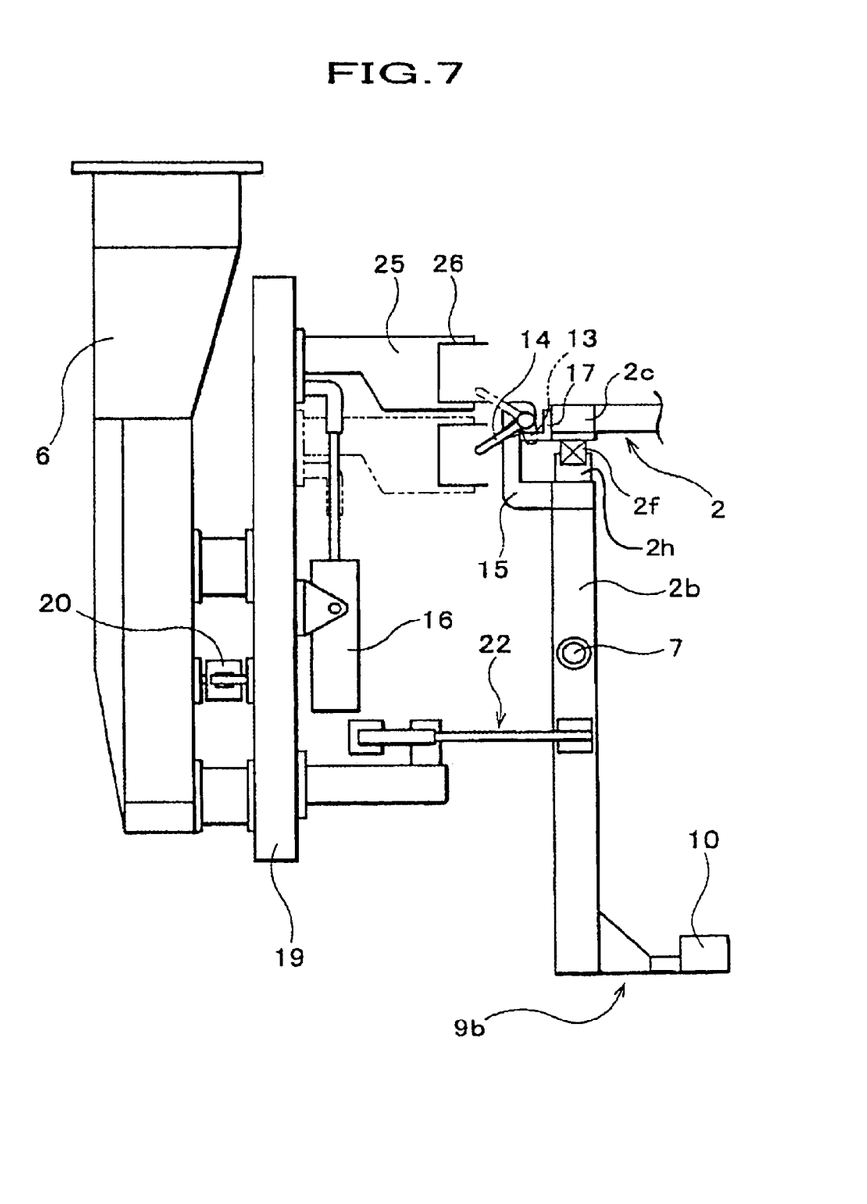
FIG. 7 shows an one side of the overhead conveyor and is a partially tipped block diagram of an embodiment of the present invention showing the relation between the engaging part and the engaging lever.
Figure 8:
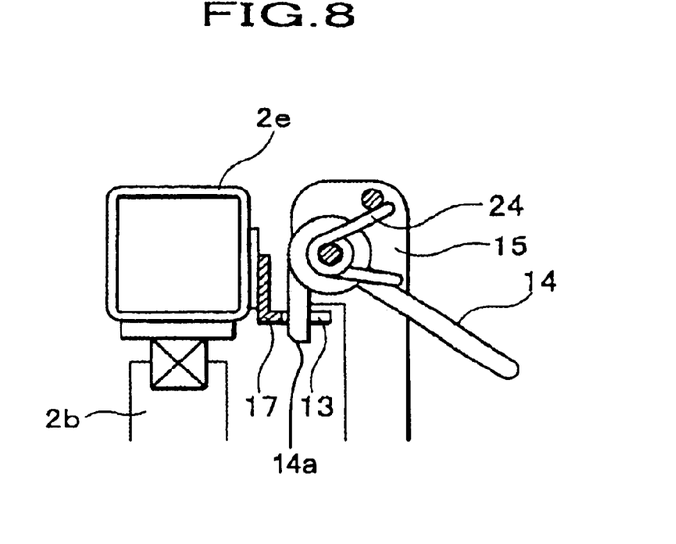
FIG. 8 is a partially tipped and enlarged view of an embodiment of the present invention showing the relation between the engaging part provided on one side of the overhead conveyor and the engaging lever.
Figure 9:
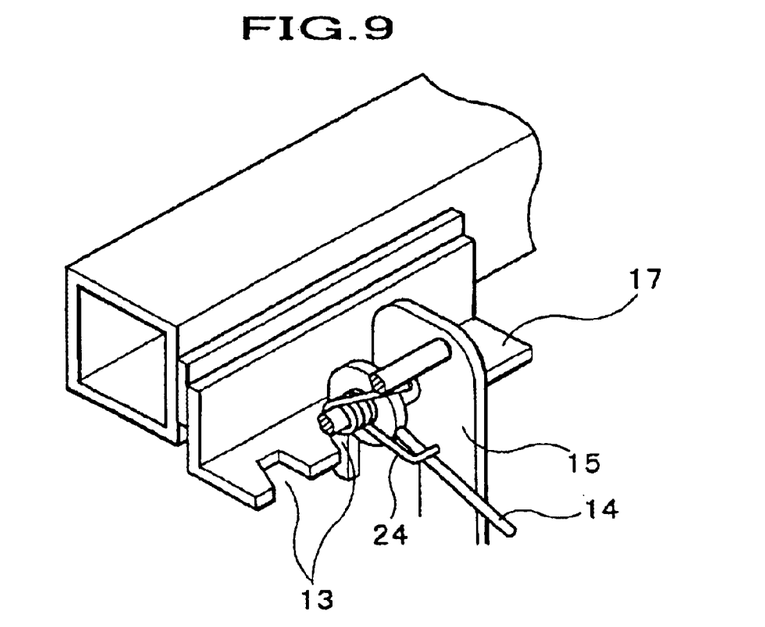
FIG. 9 is a partially tipped and enlarged perspective view of an embodiment of the present invention showing the relation between the engaging part provided on one side of the overhead conveyor and an engaging lever.

FIG. 8 and FIG. 9 show an engaging lever and an engaging part for restricting the movement of the hanger arm 2b. As shown in FIG. 8 and FIG. 9, the engaging groove 13 as an engaging part is formed on the outer peripheral surface of the connection beam 2e. The positions where the engaging groove 13 is formed are corresponded to the rear support position of various kinds of vehicle bodies F. The engaging lever 14 for restricting the movement of the rear hanger arms 2b by engaging itself into the engaging groove 13 is rotatably supported at the rear hanger arm 2b. Then, as shown in FIG. 7, the actuator 15 for engaging lever actuation, as engaging means, is arranged to operate the engaging lever 14.

Each engaging groove 13 is formed on the one side face, which faces the guide posts 6 and 6 of the connection beam 2e, in the run direction rear side of the connection beam 2e. The engaging lever 14 for engaging with the engaging groove 13 is rotatably supported to the upper part of rear hanger arms 2b through a bracket 15. A return spring 24 for making an end part 14a of the engaging lever 14 engage with the engaging groove 13 is attached to the bracket 15.

As shown in FIG. 7, a slider 19, an engaging lever 14 operating actuator 16, and a moving part 26, for making the engaging lever 14 engage with and disengage from each engaging groove 13, are arranged as follows. The slider 19 is movably supported to the guide posts 6, 6 as a fixed system so that it can move along with the moving direction of the hanger body 2d, respectively. The engaging-lever operating actuator 16 for the operation of the engaging lever 14 is attached to each of the slider 19 and each of the guide post 6. The moving part 26 having a u-shaped shape for switching the engagement state and the disengagement state of the engaging lever 14 is arranged to the tip part of the engaging-lever operating actuator 16 through a bracket 25.

When the engaging lever operating actuator 16 is enlarged and contracted, the bracket 25 is thus moved in up-and-down direction, and the engaging lever 14, arranged in the moving part 26, will be rotated by this up-and-down movement. As a result of these up-and-down movements, the end part 14a of engaging lever 14 will be engaged with or disengaged from the engaging groove 13. In this embodiment, each of the engaging groove 13 is formed on the channel material (engagement part) 17 which is fixed to one side face of the connection beam 2e. The formation manner of the engaging groove 13 is not restricted to this manner. For example, the engaging groove 13 formed on the plate or the belt plate fixed to one side of the connection beam 2e may be acceptable.

Figure 4:
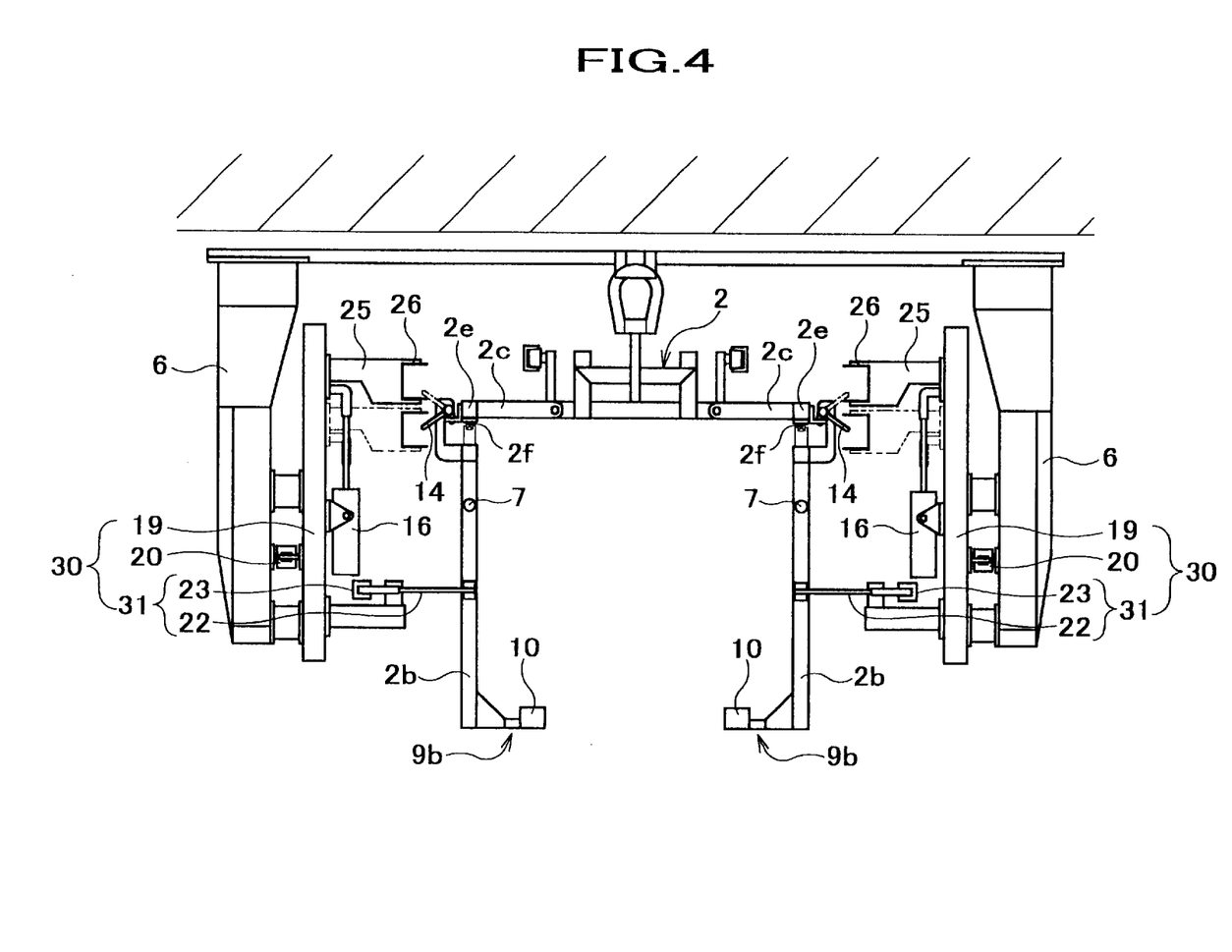
FIG. 4 is an embodiment of the present invention and a front view showing the composition of an overhead conveyor.
Figure 5:
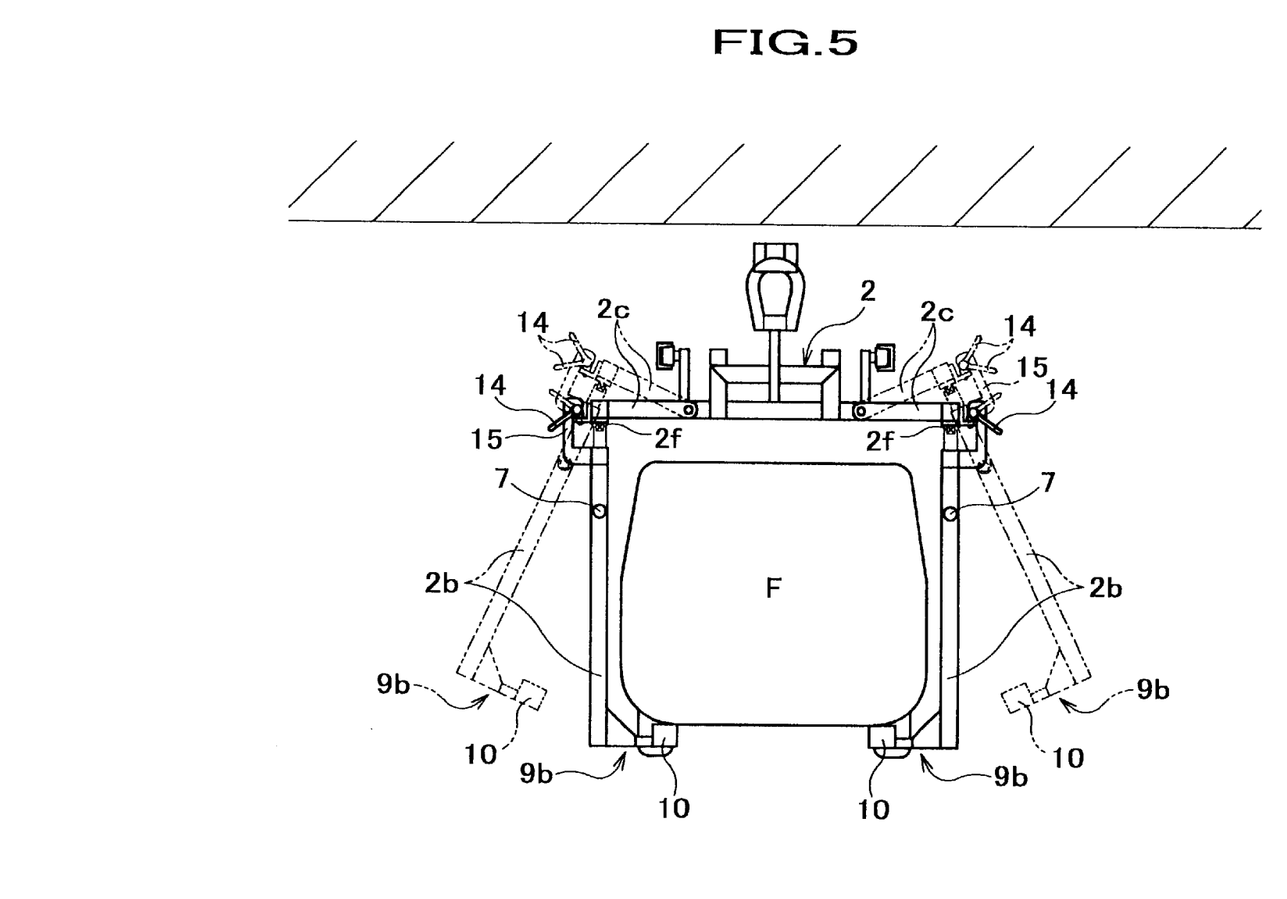
FIG. 5 is an embodiment of the present invention and a block diagram showing the rear side of an overhead conveyor.
Figure 6:
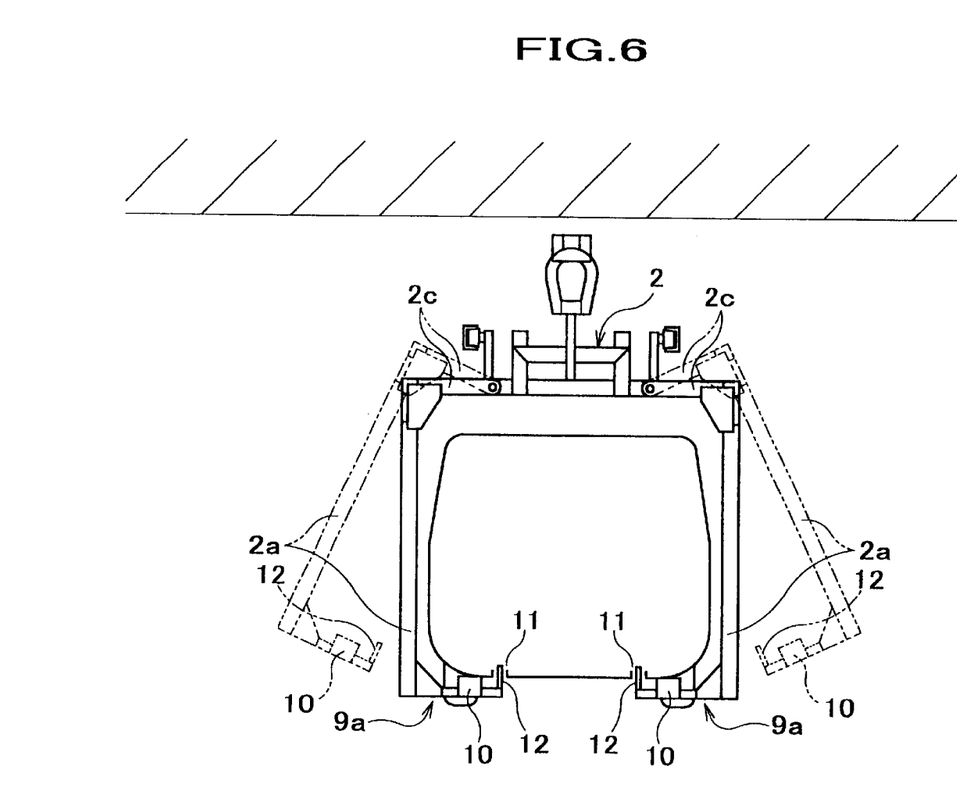
FIG. 6 is an embodiment of the present invention and a block diagram showing the front side of an overhead conveyor.
Figure 10:
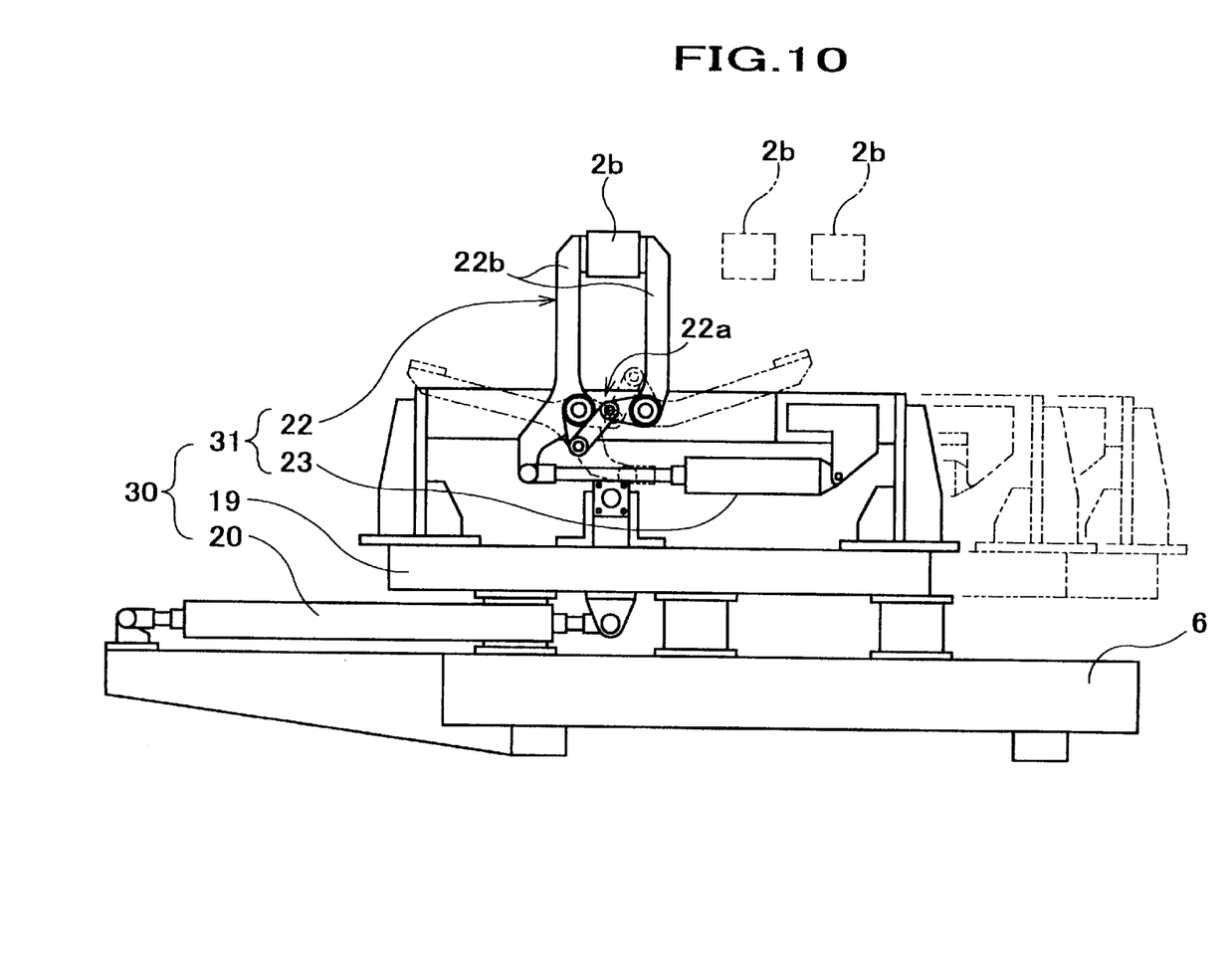
FIG. 10 is a principal part detail view of an embodiment of the present invention showing the moving means for moving the rear hanger arm of overhead conveyor.

A hanger arm moving means 30 for moving each rear hanger arm 2b is shown in FIG. 4 and FIG. 10. In the FIG. 10, the hanger arm moving means 30, which is located in the right side viewed from the fore side of the carrying direction is drawn, the hanger arm moving means 30 located in the left side is omitted. In explanation of drawing 10, therefore, the composition of the hanger arm moving means 30 located in the right side will be merely explained, are explanation of the hanger arm moving means 30 located in left side will be omitted.

As shown in FIG. 4, the hanger arm moving means 30, 30 consist essentially of a pair of the slider 19, 19, a rear hanger arm moving actuator 20, 20, and a connection means 31, 31. The pair of the slider 19, 19 move in the carrying direction of the vehicle body F on regarding the guide posts 6, 6 as a fixed system. The rear hanger arm moving actuator 20, 20 moves the sliders 19, 19 along the moving direction of the overhead conveyor 2, respectively. The connection means 31, 31 connect the rear hanger arms 2b with the sliders 19, 19. The guide posts 6, 6 are formed in the moving range of each of the rear hanger arm 2b on both sides of the carriage line of a vehicle body F. Of course, when the rear hanger arm 2b is moved along with each of the support axis 7 and the guide rail 2f via the guide 2h, each engaging lever 14 may be moved to the position corresponding to the support position for each tape of the vehicle bodies F.

As shown in FIG. 10 in detail, the connection means 31 consist essentially of tongs 22 which hold the rear hanger arms 2b, and a holding actuator 23 which runs by switching these tongs 22 to the holding position or to the releasing position. A tongs 22 are attached to the slider 19, and are moved to the holding position of the rear hanger arm 2b by elongation movement of the rear hanger arm moving actuator 20.

The tong 22 shown in drawings is constructed so that the pair of holding levers 22b, 22b may move in the proximity direction each other, by the movement of the actuation link 22a moved by the elongation of the holding actuator 23. Thus, when the tongs 22 are moved to the holding position of the rear hanger arm 2b and the holding actuator 23 is elongated, the rear hanger arm 2b will be held by the pair of holding levers 22b, 22b. And then the rear hanger arm 2b will be integrally connected with a slider 19 through tongs 22.

Therefore, in this state, when the rear hanger arm moving actuator 20 is elongated, the rear hanger arm 2b thus moves to the elongating side of the rear hanger arm moving actuator 20 united with a slider 19.

In addition, since the tongs 22 are the means for uniting each rear hanger arm 2b with the slider 19 temporarily, it is also acceptable to use other means for connecting the hanger arm 2b with the slider 19 instead of the tongs 22, 22.

As an example of such means, a mechanism as follow may be acceptable, that is, a holding mechanism, which holds the rear hanger arms 2b, 2b by an actuator (not shown), or a mechanism which enables the movement of the rear hanger arm 2b by it's movement to the rear hanger arm 2b, 2b from the guide post 6 caused by the actuation of the actuator (not shown) on engaging with the engaging hole (not shown) bored in advance on the rear hanger arm 2b. Using the above mechanism, the hanger arm 2b may be connected to the slider 19.

The function according to the preferred embodiment of the present invention will be explained with reference to FIG. 3 through FIG. 10.

In order to carry various type of a vehicle bodies F in which a wheel base differs by holding the vehicle body using each of the vehicle body supporting parts 9a, 9a, 9b, 9b, the following operations are performed. First, the engaging lever 14 is disengaged, which is engaged with the engaging groove 13 by resiliency of each return spring 24, from each engaging groove 13. And next, the rear hanger arms 2b are moved at the holding position corresponding to the wheel base of the vehicle body F which will be made to be carried.

That is, as shown in FIG. 7, the height location of the bracket 25 and the moving part 26 are adjusted so that the engaging lever 14, which is engaged with the engaging groove 13 by the resiliency of the return spring 24, will be rotated by contraction of the engaging lever operating actuator 16. Then, the location of each of the sliders 19 is made to fit to the present location of each of the rear support arm 2b by an elongation or contraction of each actuator 20 for rear hanger arm movement.

Next, by elongation of the engaging lever operating actuator 16, each engaging lever 14 is made to disengage from each engaging groove 13. After this, by operation of each of the engaging actuators 23 at elongation-side, each of the rear hanger arms 2b is engaged with each of the tongs 22, and each of the rear hanger arms 2b is made to unite with each slider 19.

After uniting each rear hanger arm 2b with each slider 19, the disengaging condition of the engaging lever 14 is kept by each of the engaging lever operating actuators 16. And each of the rear hanger arm operating actuators 20 is elongated or contracted on keeping the holding condition of each rear hanger arm 2b by each tong 22. As a result of these operations, each of the rear hanger arms 2b is stopped at the position corresponding to the wheel base of the vehicle body F.

Then, by moving the engaging lever operating actuator 16 to the contraction side thereof at this stopped position, the engaging lever 14, which is lying at the inside of each moving part 26, is rotated to the engagement side of each of the moving parts 26. The energization force of the return-spring 24 is released by the rotation of this engaging lever 14, and the engaging lever 14 is made to engage with an engaging groove 13.

Consequently, since the movement in the fore-and-aft direction of each guide rail 2f and each support axis 7 is restricted, each of the rear hanger arms 2b, 2b is held in the vehicle body supporting position corresponding to the wheel base of the vehicle body F.

Then, the holding of each of the rear hanger arms 2b by each of the tongs 22 is released by the contraction of each actuator 23. And making each of the rear hanger arm moving actuators 20 contract to the home position, and the rear hanger arm moving actuator 20 is contracted to the home position. Thus, the process before delivery of the vehicle body F to the lifter is completed.

In addition, various types of sensors as follow may be arranged on the overhead conveyor according to this invention: A sensor, which detects the stop position of each hanger body 2d; A sensor which detects the moved position of the engaging lever 14 or the rear hanger arm 2b on each of the engaging grooves 13 of the hanger body 2d, and detects whether the engaging lever 14 can be engaged with or disengaged from each engaging groove 13, at the moved position (not shown); A sensor (not shown) which detects whether the engaging lever 14 is being engaged to the engaging groove 13 or not; A sensor which detects whether each of the vehicle body supporting parts 9a and 9b is supporting the vehicle body (not shown); A sensor (not shown) which detects whether each of the rotation arms 2c is opened at the delivery position of a vehicle body.

In such a case, with the overhead conveyor having such various sensors, the operation of each actuator 16, 20 and 23 and the detection of poor actuation of each actuator 16, 20, and 23 will be achieved by operating the switch (not shown). Of course, in this case, and by detecting the position of each of the actuators 16, 20, and 23 using the above-described censors and the control unit (not shown) such as a sequencer or a computer and the like, it is possible to make the overhead conveyor move automatically.

In addition, in this preferred embodiment of the present invention, the overhead conveyor in which the rear hanger arms 2b, 2b are formed movably was explained. But the present invention is not restricted in this case, for example, the overhead conveyor in which the rear hanger arms 2b, 2b are fixed and the front hanger arms 2a, 2a are formed movably may be selected. Moreover, the suitable equipment as actuators 16, 20, and 23 will be chosen out from an oil hydraulic cylinder, a pneumatic cylinder, and a screw formula jack. It will be appreciated that modification may be made in our invention within the limits of the technical thought. And it should be understood that such as modification is cover by our invention.

INDUSTRIAL APPLICABILITY

With the present invention, a vehicle body will be carried regardless of the difference in a form of a vehicle, on stabilized and supporting the vehicle body, without being influenced by the elasticity of a tire, and the buffer action of suspension equipment. Moreover, since a body weight can be used as it is, installation of various components can be made good and the like, so the present invention has a great effectiveness. Moreover, since the part of movable hanger arms is engaged by one engaging lever and one actuator, costs can be cut effectively.

What is claimed is:

1. An overhead conveyor comprising:
   a hanger body, which moves along a rail provided at a ceiling side of the hanger body;
   a pair of connection arms, wherein each connection arm is swingably supported on opposing sides of the hanger body, respectively;
   a pair of front hanger arms, each of which is connected to the hanger body through the connection arms, respectively, so as to approach a vehicle body from both sides of the vehicle body, and support a bottom of a fore-side of the vehicle body;

a pair of rear hanger arms, each of which is connected to the hanger body through the connection arms, respectively, so as to approach the vehicle body from both sides of the vehicle body and support a bottom of a rear-side of the vehicle body;

an engaging lever, which is attached to one of the pair of front hanger arms and the pair of rear hanger arms;

an engaging part, which is provided at each of the connection arms, respectively, for engaging and disengaging with the engaging lever; and an actuator, which controls the engaging and disengaging between the engaging lever and the engaging part.

2. An overhead conveyor according to claim 1, wherein each of the front hanger arms is fixed at a front end part of the connection arm, as viewed in the traveling direction of the vehicle body, wherein the engaging lever is attached to each of the rear hanger arms, and wherein a guide is provided on each of the rear hanger arms, for engaging with a guide rail that is provided on each of the connection arms, to facilitate a sliding movement of the rear hanger arms in the traveling direction of the vehicle body.

3. An overhead conveyor according to claim 2, further including a frame that synchronizes the motion of the front hanger arm with the motion of the rear hanger arm, when the connection arm is swung.

4. An overhead conveyor according to claim 2, wherein each of the front hanger arms includes a positioning pin which is inserted into a positioning hole that is provided at the bottom of the fore-side of the vehicle body, for facilitating an accurate positioning of each of the front hanger arms with the vehicle body.

5. An overhead conveyor according to claim 1, further comprising:

a second actuator unit, which moves the actuator along a traveling direction of the hanger body in compliance with the position of the hanger arm, to which the engaging lever is provided, so as to control the engaging and disengaging of the engaging lever.

6. An overhead conveyor according to claim 5, wherein each of the front hanger arms is fixed at a front end part of the connection arm, as viewed in a traveling direction of the vehicle body, wherein the engaging lever is attached to each of the rear hanger arms, and wherein a guide is provided on each of the rear hanger arms, for engaging with a guide rail that is provided on each of the connection arms, to facilitate a sliding movement of the rear hanger arms in the traveling direction of the vehicle body.

7. An overhead conveyor according to claim 6, further including a frame that synchronizes the motion of the front hanger arm with the motion of the rear hanger arm, when the connection arm is swung.

8. An overhead conveyor according to claim 6, wherein the front hanger arms each include a positioning pin which is inserted into a positioning hole provided at the bottom of the fore-side of the vehicle body, for facilitating an accurate positioning of each of the front hanger arms with the vehicle body.

9. An overhead conveyor according to claim 6, further including a holding unit for holding the rear hanger arms, controlled by the second actuator unit so as to move along the traveling direction of the vehicle body.

* * * * *